United States Patent
Diprose et al.

(10) Patent No.: US 12,245,579 B2
(45) Date of Patent: Mar. 11, 2025

(54) APPARATUS AND METHOD FOR ELECTRICALLY KILLING PLANTS

(71) Applicant: Ubiqutek Ltd., Birmingham (GB)

(72) Inventors: Andrew Diprose, London (GB); Michael Diprose, Derbyshire (GB)

(73) Assignee: Ubiqutek Ltd., Warwickshire (GB)

( * ) Notice: Subject to any disclaimer, the term of this patent is extended or adjusted under 35 U.S.C. 154(b) by 53 days.

(21) Appl. No.: 17/926,865

(22) PCT Filed: May 18, 2021

(86) PCT No.: PCT/EP2021/063104
§ 371 (c)(1),
(2) Date: Nov. 21, 2022

(87) PCT Pub. No.: WO2021/233892
PCT Pub. Date: Nov. 25, 2021

(65) Prior Publication Data
US 2023/0200369 A1    Jun. 29, 2023

(30) Foreign Application Priority Data
May 22, 2020 (EP) .................................... 20176016

(51) Int. Cl.
*A01M 21/04* (2006.01)

(52) U.S. Cl.
CPC ............................... *A01M 21/046* (2013.01)

(58) Field of Classification Search
CPC ...... A01M 21/00; A01M 21/02; A01M 21/04; A01M 21/046
See application file for complete search history.

(56) References Cited

U.S. PATENT DOCUMENTS

| 4,338,743 | A |   | 7/1982 | Gilmore |
| 5,600,918 | A | * | 2/1997 | Carr ........................ A01B 1/00 47/1.3 |

(Continued)

FOREIGN PATENT DOCUMENTS

| CA | 3057773 A1 | * | 5/2019 | .......... A01M 21/046 |
| DE | 102017124934 A1 | | 4/2019 | |

(Continued)

OTHER PUBLICATIONS

PCT International Search Report and Written Opinion, International Application No. PCT/EP2021/063104, Jun. 18, 2021, 9 pages.

*Primary Examiner* — Ebony E Evans
(74) *Attorney, Agent, or Firm* — Umberg Zipser LLP; Ryan Dean

(57) ABSTRACT

An electrical apparatus to kill a plant or at least attenuate plant growth, the apparatus comprising:
  an electrical energy supply unit;
  an applicator unit comprising an applicator electrode;
  a return unit comprising a return electrode;
  electrical circuitry;
the electrical energy supply unit arranged to apply electrical energy through a transmission circuit comprising the applicator electrode, and the return electrode,
wherein said electrical circuitry implements a plant treatment mode and a detection mode,
wherein the electrical circuitry in the detection mode to determine a plant in operative proximity to the transmission circuit, and based on said determination activate the plant treatment mode in which treatment electrical energy, for killing or at least attenuating plant growth, is applied through the transmission circuit.

14 Claims, 6 Drawing Sheets

(56) References Cited

U.S. PATENT DOCUMENTS

| | | | | |
|---|---|---|---|---|
| 2006/0265946 A1* | 11/2006 | Schwager | ........... | A01M 21/046 47/1.3 |
| 2007/0227418 A1* | 10/2007 | Polfer | .................... | A01B 39/18 111/127 |
| 2018/0132473 A1* | 5/2018 | Diprose | .............. | A01M 21/046 |
| 2019/0239502 A1* | 8/2019 | Palomares | ........... | G05D 1/0246 |
| 2023/0048111 A1* | 2/2023 | Lehnen | ............... | A01M 21/046 |

FOREIGN PATENT DOCUMENTS

| | | | | | |
|---|---|---|---|---|---|
| DE | 102018251708 | A1 | * | 7/2020 | |
| DE | 102019219896 | A1 | * | 6/2021 | ............ A01M 19/00 |
| EP | 3552919 | A1 | * | 10/2019 | .......... A01M 21/046 |
| EP | 3569767 | A1 | | 11/2019 | |
| EP | 4039091 | A1 | * | 8/2022 | .......... A01M 21/046 |
| FR | 2770969 | A1 | * | 5/1999 | .......... A01M 21/046 |
| GB | 2431850 | A | * | 5/2007 | .......... A01M 21/046 |
| WO | WO-2016016627 | A1 | * | 2/2016 | ............... A01H 3/04 |
| WO | WO-2019144231 | A1 | * | 8/2019 | ........... A01B 69/001 |
| WO | WO-2023126936 | A1 | * | 7/2023 | ............... A01G 7/04 |

\* cited by examiner

APPARATUS AND METHOD FOR ELECTRICALLY KILLING PLANTS

TECHNICAL FIELD

The present disclosure relates to electric apparatus that is configured to attenuate plant growth by the application of electrical energy thereto.

BACKGROUND

In properties both commercial and domestic, it is common to kill or at least control the growth of unwanted plants, commonly referred to as weeds. Conventional methods include treatment with a pesticide or more particularly a herbicide. However, there is a growing concern over such treatment for environmental reasons and unwanted exposure of herbicides to humans and animals. Moreover, weeds are increasingly becoming naturally resistant so herbicides are becoming more and more ineffective. As a result of these numerous drawbacks, consumers are increasingly demanding organic produce, for which the use of herbicides is increasingly prohibited.

Consequently, there is a desire for alternative treatments, which do not include the above drawbacks. An example includes treatment by the application of electrical energy. U.S. Pat. No. 4,338,743 discloses such apparatus, wherein an electrical energy is applied at 14.4 kV at 60±5 Hz to plants. Such apparatus have failed to become widespread in the market over concern over safety. For example, the high voltage may in some instances increased the risk combustion of the weed and/or surrounding material, which in areas that represent fire risk, is particularly undesirable.

Therefore, despite the effort already invested in the development of said apparatus further improvements are desirable.

SUMMARY

The present disclosure provides electrical apparatus to kill a plant or at least attenuate plant growth. The apparatus includes an electrical energy supply unit; an applicator unit comprising an applicator electrode; a return unit comprising a return electrode and; electrical circuitry. The electrical energy supply unit is arranged to apply electrical energy through a transmission circuit comprising the applicator electrode and the return electrode and a plant.

In embodiments, the electrical circuitry implements a plant treatment mode and a detection mode.

In the detection mode the electrical circuitry to determine a plant in operative proximity to the transmission circuit, and based on said determination activate the plant treatment mode in which treatment electrical energy, for killing or at least attenuating plant growth, is applied to the transmission circuit.

As used herein "a plant in operative proximity to the transmission circuit" may refer to a plant arranged to receive electrical energy from the transmission circuit (e.g. including in direct contact or proximal to the applicator electrode, e.g. such that it can receive the electrical energy directly or via an electrical arc).

By implementing a detection mode and a plant treatment mode, the apparatus can apply electrical energy though the transmission circuit that is optimal for killing a plant only when a plant is detected. In this way the apparatus may be safer and/or more energy efficient.

In embodiments, a detection system implements the detection mode. The detection system may be arranged to apply detection electrical energy through the transmission circuit. The detection system may determine a plant in operative proximity to the transmission circuit based on one or more properties of the detection electrical energy (e.g. properties that may include current, voltage, power, phase) though the transmission circuit crossing a threshold (including having crossed, i.e. being over the threshold as opposed to only the state of being below then over the threshold).

By implementing plant detection based on property of the detection electrical energy through the transmission circuit, detection may be conveniently implemented without a dedicated sensor arrangement.

In embodiments the detection electrical energy is selected not to kill or attenuate plant growth, e.g. it may be selected to be non-destructive to the plant compared to the treatment electrical energy. The detection electrical energy may be selected to be less dangerous to a human compared to the treatment electrical energy.

In embodiments, the detection electrical energy is implemented with a lower or a higher electrical quantity than the treatment electrical energy, wherein the electrical quantity is one or more of the following: frequency; voltage; current; power; duty; phase. By implementing the detection electrical energy with a different electrical quantity it can be distinguished from the treatment electrical energy, e.g. when applied in an off cycle of the treatment electrical energy.

In embodiments, the detection electrical energy is implemented with a lower energy than the treatment electrical energy. The lower energy of the detection electrical energy may be implemented by one or more of the voltage, current, phase, duty.

By applying the detection electrical energy in the transmission circuit at lower energy in detection mode, the apparatus may be safer, e.g. if a human were arranged in the transmission circuit during detection the human would receive only the lower energy. The apparatus may also be more energy efficient, since only the higher energy is applied when a plant is detected.

For example, the energy, voltage or electrical current, of the detection electrical energy may be selected to by less than or equal to 95% or 90% or 80% or 70% or 60% or 50% or 40% or 30% of the equivalent property of the treatment electrical energy. The equivalent property of the treatment electrical energy may be that when initially applied to the plant, rather that partially through a treatment process or it may be an average of a treatment process.

In embodiments, the detection electrical energy is implemented with a different frequency than the treatment electrical energy. In embodiments, the detection electrical energy is implemented with a lower frequency than the treatment electrical energy. Since the energy of the detection electrical energy may be lower than that of the treatment electrical energy, a lower frequency of detection electrical energy may be implemented without substantially increasing danger to a human. The lower frequency, e.g. of the same waveform, may also enable higher energy efficiency. The lower frequency may also stress componentry less so that componentry life is extended.

In embodiments, the detection electrical energy is implemented with a higher frequency than the treatment electrical energy. The higher frequency may be safer to a human. A higher frequency may also detect a plant sooner in proximity to the transmission circuity since high frequency electrical energy is more likely to jump.

In embodiments, one or both of the detection electrical energy and treatment electrical energy is implemented as a steady current, e.g. one without a repeating waveform.

In embodiments, in the detection mode the electrical circuitry is configured to periodically check for the presence of a plant in operative proximity to the transmission circuit. As used herein the term "check" may refer to an active period where the detection system determines whether a plant in operative proximity to the transmission circuit, as opposed to an inactive period where no check is performed. In the instance of plant detection based on property of the electrical energy through the transmission circuit, during a check the detection electrical energy may be applied and when a check is not performed the detection electrical energy my not be applied.

By implementing a detection mode that performs a check periodically, the efficiency of the apparatus may be increased, since less electrical energy is used. Moreover, (particularly in the instance of plant detection based on property of the electrical energy through the transmission circuit) the safety of the apparatus is improved, since when the detection system is not performing a check a human will not receive detection electrical energy if arranged in the transmission circuit and the period between checks provides a human with a chance to move away from the transmission circuit.

In embodiments, the detection mode may perform a check every 0.5 millisecond to 20 milliseconds. A high frequency of checking may improve accuracy.

In embodiments, the detection mode may perform a check every 0.1 second to 1 second. A low frequency of checking may improve safety, since a human is provided with a chance to move away from the transmission circuit.

In embodiments, after an initial determination if a plant is in operative proximity to the transmission circuit, a frequency of the checks is increased, e.g. from the previously mentioned low to high ranges. By increasing the frequency of the checks after plants are identified the efficiency of the apparatus may be improved. By having a lower frequency of checks post determination of the presence of a plant, safety may also be improved, e.g. a low frequency can enable a human to move away from the transmission circuit.

In embodiments, when the apparatus is initiated the electrical circuitry starts in the detection mode. In embodiments, the detection mode is started with a low frequency of checks, compared to the frequency of checks once a plant has been detected.

In embodiments, the electrical circuity is arranged to receive velocity information and to determine a frequency of checking based on the velocity information. The velocity information may be provided by one or more of: the camera system as described herein; a vehicle navigation system; a navigation device (e.g. a GPS device) incorporated by the electrical circuitry. The frequency of checks may increase with vehicle velocity. By varying the frequency of checks with velocity a presence of a plant may be more accurately determined whilst optimising efficiency, e.g. by increasing checks with velocity, a plant in operative proximity is less likely to be undetected.

In embodiments, when a plant is detected in the detection mode, the detection mode is transitioned to plant treatment mode.

However, in other embodiments plant detection and plant treatment mode are operated concurrently, for example in embodiments, the detection mode determines, during the plant treatment mode, no plant in operative proximity to the transmission circuit and based on said determination deactivates the plant treatment mode.

By implementing the electrical circuitry to determine a plant no longer in operative proximity to the transmission circuit, the apparatus can deactivate plant treatment mode such that the electrical energy to kill or at least partially attenuate plant growth is not transmitted through the transmission circuit. The apparatus may have improved safety since the likelihood of electrical arcing, or a human receiving said electrical energy, is reduced. The apparatus may also be more energy efficient, since only the higher energy is applied when a plant is detected.

The plant treatment mode may be deactivated instantaneously or after a predetermined amount of time (e.g. more than 1 second or between 1 and 30 seconds). By deactivating after a predetermined amount of time it may be ensured that a previously detected plant is fully killed, and that an adjacent plant is not left untreated.

In embodiments, after deactivation of the plant treatment mode, detection mode may be maintained or resumed.

In embodiments, the detection mode may determine a plant in operative proximity to the transmission circuit during the treatment mode based on one or more properties of the treatment electrical energy (e.g. properties that may include current, voltage, power, phase) though the transmission circuit crossing a threshold.

Alternatively, detection electrical energy may be applied during an off cycle (e.g. between waveforms) of the treatment electrical energy and a plant in operative proximity to the transmission circuit may be determined based on one or more properties of the detection electrical energy (e.g. properties that may include current, voltage, power, phase) though the transmission circuit crossing a threshold.

In embodiments, the detection system implements a camera system that is arranged to determine, in the detection mode, a plant in operative proximity to the transmission circuit. By implementing a camera system, one or more cameras can determine with a high level of accuracy whether a plant is arranged in the transmission circuit. In embodiments, the electrical circuitry implements image processing software to identify by feature recognition a plant (e.g. vs. a human or a rock) in one or more images from the camera system.

In embodiments, a camera system determines plant information (e.g. a geometric property of the plant and/or a plant type) from one or more images of the plant and a property of the treatment electrical energy (e.g. properties that may include current, voltage, power, phase, frequency, duty) may be selected to most effectively kill or attenuate plant growth based on the plant information.

By tuning the treatment electrical energy to the size/type of plant the plant may be more effectively killed and/or the apparatus may be more efficient. This embodiment may be implemented in conjunction with the detection mode, or in a further embodiment that does not include a detection mode.

In a first example, if the plant is identified as a crop then the treatment electrical energy may not be applied, if the plant is identified as a weed then the treatment electrical energy may be applied. In a second example, the treatment electrical energy is selected based on a geometric property and/or type of the plant.

In embodiments, the detection system implements a proximity sensor that is arranged to determine, in the detection mode, a plant in operative proximity to the transmission circuit. A proximity sensor may be a cost-effective implementation of the detection system. In embodiments, the proximity sensor includes one or more of an: an inductive sensor; a capacitive sensor; an infra-red sensor; a radar; ultrasonic; a mechanically actuated sensor (e.g. a pressure sensor); other sensor.

In embodiments, the detection system implements a plurality of different plant detection implementations (e.g. two or more of a proximity sensor; a camera system; plant detection based on a property of the electrical energy though the transmission circuit; other detection implementation, to determine if a plant is in operative proximity to the transmission circuit.

By combining multiple plant detection implementations, a high level of accuracy may be achieved. The multiple plant detection implementations may be combined with logic operators and/or a weighted average.

In embodiments, a camera system is implemented to determine a plant in and/or coming into operative proximity to the transmission circuit, which triggers plant detection based on property of the electrical energy though the transmission circuit and/or a proximity sensor. In such an implementation the camera system can be implemented to determine a plant coming into range of the applicator, i.e. a coarse estimate of the transmission circuit comprising a plant, based on direction and/or velocity of movement of the applicator electrode.

In embodiments, the detection system is arranged to determine the presence of a human or animal in operative proximity to the transmission circuit, and based on said determination prevent the transmission of electrical energy (e.g. treatment electrical energy and/or detection electrical energy) through the transmission circuit.

As used herein "a human or animal in operative proximity to the transmission circuit" may refer to a human/animal arranged to receive electrical energy from the transmission circuit (e.g. including in direct contact or proximal to the applicator electrode, e.g. such that they can receive the electrical energy directly or via an electrical arc).

By implementing a detection system that can detect a human in the transmission circuit and prevent the transmission of any electrical energy through the transmission circuit, the safety of the apparatus may be increased.

A human or animal in operative proximity to the transmission circuit may be determined by one or more implementations of the detection system. With the detection system implemented as a camera system, the presence of a human or animal may be determined by image processing and feature recognition, e.g. in optical or infra-red wavebands. A camera system may also determine the presence of a human or animal by determining an object as having motion. With the detection system implemented as detection electrical energy a human in operative proximity to the transmission circuit may be determined based on one or more properties of the detection electrical energy (e.g. properties that may include current, voltage, power, phase) though the transmission circuit crossing a threshold which is different to the threshold if a plant was in operative proximity to the transmission circuit.

The present disclosure provides use of the apparatus as disclosed herein for treatment of a plant, e.g. to kill the plant. The use may implement any feature of the preceding embodiment or another embodiment disclosed herein.

The present disclosure provides a method of treating a plant with electrical energy, the method comprising: detecting a plant in operative proximity of a transmission circuit comprising an applicator electrode, and a return electrode, and; based on the detection of the plant, applying electrical energy to kill or at least partially attenuate growth of the plant.

The method may implement any feature of the preceding embodiment or another embodiment disclosed herein. The present disclosure provides electrical circuitry or a computer program to implement the method of the preceding embodiment or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
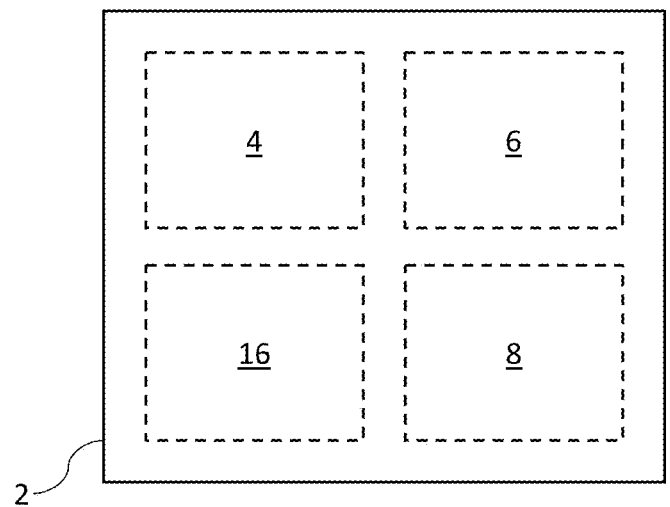
FIG. 1 is a block system diagram showing embodiment electrical apparatus to attenuate plant growth.

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein, the term "weed" may refer to an undesired plant in a human controlled setting, such as a farm field, garden, lawn or park. A plant may refer to a multicellular photosynthetic eukaryote.

As used herein, the term "electrical arc" or 'arc" may refer to an electrical breakdown of a gas that produces an electrical discharge. An arc is formed by an electrical current through a normally nonconductive medium such as air, and is characterized by a plasma, which may produce visible light. An arc discharge is characterized by a lower voltage than a glow discharge and relies on thermionic emission of electrons from the electrodes supporting the arc.

As used herein, the term "electrical energy" may refer to the electrical energy applied to the plant, e.g. though a transmission circuit. It may include the detection electrical energy and/or treatment electrical energy. The electrical energy may comprise a periodic or aperiodic waveform, i.e. a waveform that continuously repeats with the repeating units therein having a constant or a varying period, e.g. a pulsed wave with a fixed duty cycle or a varying duty cycle. The shape of the repeating unit may be one of or a combination of one or more of the following forms: sine wave; saw-tooth wave; triangular wave; square wave; pulsed, e.g. DC pulsatile, half-wave rectified; other known form. The exact shape of the repeating unit may be an approximation of one of the aforesaid forms for reasons of distortion, e.g. overshoot/undershoot and the associated ringing and settle time. The repeating unit may be positive or negative or a combination thereof with respect to a selected reference value, which is typically earth or the 0 V of the voltage supply but may be another positive or negative voltage level. The frequency of the waveform may be above 25 Hz, 1 khz, 10 kHz, 18 kHz or 25 kHz. It will be understood that when referring to the voltage of the electrical energy, when the electrical energy has a waveform, the voltage is in respect of a suitable quantity, such as RMS, peak or other. The same applies for other electrical quantities such as power and current.

As used herein, the term "electrical energy supply unit" may refer to any unit or system, including a distributed system, for generating and/or conditioning electrical energy for supply to a transmission circuit which, in use, incorporates a plant.

As used herein, the term "electrical circuitry" or "electric circuitry" or "electronic circuitry" or "circuitry" or "control circuitry" may refer to, be part of, or include one or more of the following or other suitable hardware or software components: an Application Specific Integrated Circuit (ASIC); electronic/electrical circuit (e.g. passive electrical components, which may include combinations of transistors, transformers, resistors, capacitors); a processor (shared, dedicated, or group); a memory (shared, dedicated, or group), that may execute one or more software or firmware programs; a combinational logic circuit. The electrical circuitry may be centralised on the apparatus or distributed, including distributed on board the apparatus and/or on one or more components in communication with the apparatus, e.g. as part of the system. The component may include one or more of a: networked-based computer (e.g. a remote server); cloud-based computer; peripheral device. The circuitry may be implemented in, or functions associated with the circuitry may be implemented by, one or more software or firmware modules. The circuitry may include logic, at least partially operable in hardware.

As used herein, the term "processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic. The processor may have various arrangements corresponding to those discussed for the circuitry, e.g. on-board and/or off board the apparatus as part of the system.

As used herein, the term "computer readable medium/media" or "data storage" may include conventional non-transient memory, for example one or more of: random access memory (RAM); a CD-ROM; a hard drive; a solid state drive; a flash drive; a memory card; a DVD-ROM; a floppy disk; an optical drive. The memory may have various arrangements corresponding to those discussed for the circuitry/processor.

As used herein, the term "information carrying medium" may include one or more arrangements for storage of information on any suitable medium. Examples include: data storage as defined herein; a Radio Frequency Identification (RFID) transponder; codes encoding information, such as optical (e.g. a bar code or QR code) or mechanically read codes (e.g. a configuration of the absence or presents of cut-outs to encode a bit, through which pins or a reader may be inserted).

As used herein, the term "applicator unit" or "applicator" may refer to any suitable device for applying electrical energy to a plant, including by direct contact with the plant and/or spark transmission.

As used herein, the term "earth unit" or "return unit" may refer to any suitable device for receiving electrical energy from a circuit including the plant and optionally the ground to complete a transmission circuit, including by direct contact with the plant and/or spark transmission.

As used herein, the term "apparatus" or "electrical apparatus" may refer to any combination of one or more of the following for treatment of a plant: electrical energy supply unit; electrical circuitry; applicator unit; earth unit; earth electrode; applicator electrode; transmission circuit.

Figure 2:
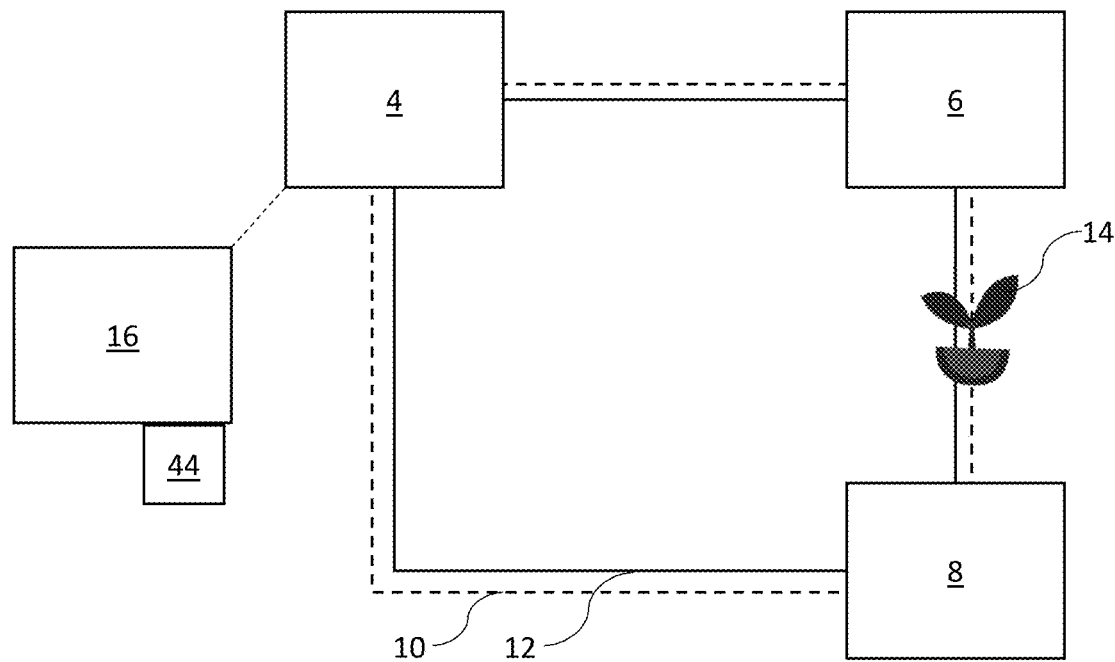
FIG. 2 is a schematic diagram showing the apparatus of FIG. 1.

Referring to FIGS. 1 and 2, electrical apparatus 2 to attenuate plant growth, comprises an electrical energy supply unit 4, an applicator unit 6 and an earth unit 8. The electrical energy supply unit supplies electrical energy 10 around a transmission circuit 12, which includes the applicator unit 6, earth unit 8.

The transmission circuit 12, when treating a plant, may include said plant 14. It will be understood that depending on the operative arrangement of the applicator unit and earth unit, a return path of the transmission circuit 12 optionally includes other matter, such as proximal earth and fluid (e.g. air and moisture) to the plant.

The apparatus 2 includes electrical circuitry 16, which may implement a range of control operations. In embodiments, said circuitry 16 is operable to control the electrical energy supplied by the electrical energy supply unit 4 through the transmission circuit 12, as will be discussed.

Figure 3:
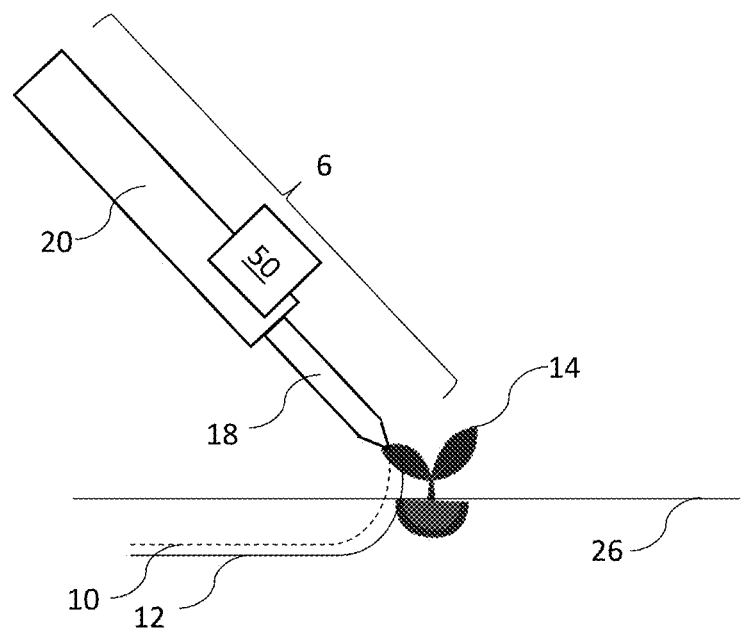
FIG. 3 is a schematic diagram showing an applicator unit of the apparatus of FIG. 1.

Referring to FIG. 3, the applicator unit 6 is adapted to receive electrical energy 10 from the electrical energy supply unit 4 and to transmit said electrical energy 10 to the plant 14 (shown in FIG. 2). The applicator unit 6 comprises an applicator electrode 18. The applicator electrode 18 is electrically connected to the electrical energy supply unit 4 by an electrically conductive material, e.g. by wiring or solid material, which forms part of the transmission circuit 12.

The applicator electrode 18 is adapted to apply the electrical energy 10 to the plant 14. In embodiments, the applicator electrode 18 is arranged for direct contact with the plant 14. As used herein "direct contact" may refer to physical contact between the plant and electrode, and may be achieved by operatively arranging the electrode to be exposed from a body of the applicator. The applicator electrode 18 comprises an electrically conductive material e.g. copper, zinc, bronze, brass, aluminum or steel.

The geometric configuration of the applicator electrode 18 may be selected depending on the intended treatment regimen, for example: a rod for sweeping through areas of dense plants; a hook-shape for separating plants.

The applicator unit 6 comprises body 20 to carry the applicator electrode 18. The body 20 may be adapted to be held by a user or fixed to a chassis depending on the particular configuration of the apparatus 2 (e.g. adapted for domestic or agricultural implementation respectively).

In embodiments, which are not illustrated, the applicator electrode is implemented as a plurality of electrodes, e.g. for treatment of multiple plants at a given moment.

Figure 4:
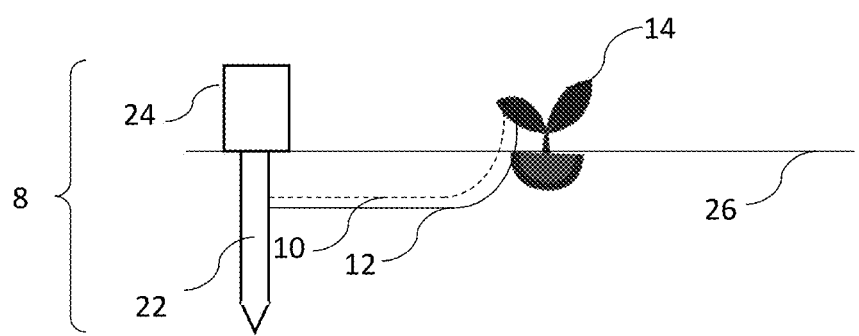
FIG. 4 is a schematic diagram showing an earth unit of the apparatus of FIG. 1.

Referring to FIG. 4, the earth unit 8 is adapted to receive electrical energy 10 from the applicator unit 6 via the plant 14 (shown in FIG. 2). The earth unit 8 comprises body 24 to carry earth electrode 22. The earth electrode 22 is electrically connected to the electrical energy supply unit 4 by an electrically conductive material, e.g. by wiring or solid material, which forms part of the transmission circuit 12.

The earth electrode 22 is adapted to provide a return for electrical energy 10 via the plant 14 to complete the transmission circuit 12. In embodiments, the earth electrode 22 is arranged for direct contact with the ground 26 (shown in FIG. 4). As used herein "direct contact" may refer to physical contact between the ground and electrode, and may be achieved by operatively arranging the electrode to be exposed from a body of the earth unit. The applicator electrode 18 comprises an electrically conductive material e.g. copper, zinc, bronze, brass, aluminum or steel.

The geometric configuration of the earth electrode may be selected depending on the intended implementation of the apparatus, for example: an implement for insertion into the ground (e.g. for apparatus that in use remains in a generally fixed position), such as a rod or spike; an implement for movement along the ground (e.g. for apparatus that in use has a variable position), such as a rod or spike), such as a flat plate or roller, and; a combination of the aforesaid implementations.

The earth unit 8 comprises body 24 to carry the earth electrode 22. The body 24 may be adapted to be held by a user or fixed to a chassis depending on the particular configuration of the apparatus 2 (e.g. adapted for domestic or agricultural implementation respectively).

In embodiments, which are not illustrated, the earth electrode is implemented as a plurality of electrodes, e.g. for treatment of multiple plants at a given moment.

Generally, the apparatus 2 is arranged with the earth electrode 22 arranged in operative proximity to the applicator electrode 18. Operative proximity may refer to a geometric arrangement to limit the path of the electrical energy 10 through the ground 26, which may advantageous for reasons of efficient and/or electrical safety.

Figure 5:
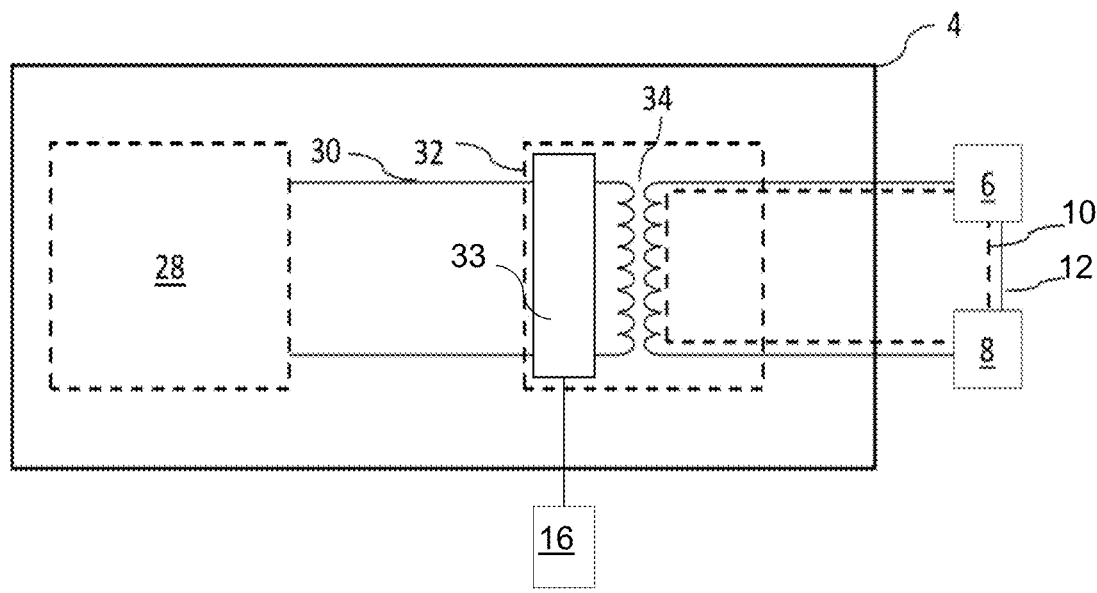
FIG. 5 is a schematic diagram showing an electrical energy supply unit of the apparatus of FIG. 1.

Referring to FIG. 5, the electrical energy supply unit 4 is arranged to supply electrical energy 10 to the transmission circuit 12. The electrical energy supply unit 4 includes a power supply 28 for supply of supply electrical energy 30. The power supply 28 may be implemented as one or more of the following: a battery; a fuel cell; a generator, including an internal combustion engine powered generator, which may be implemented with a dedicated internal combustion engine or a shared internal combustion engine for other agricultural equipment, e.g. a tractor, which is arranged to drive the generator; other like. The power supply 28 provides supply electrical energy 30, in alternating current (AC) or direct current (DC), including pulsated or with other form with a fixed quantity, e.g. in one or more or power; voltage; current; frequency; phase.

The electrical energy supply unit 4 includes an electrical energy processing unit 32 for processing of the supply electrical energy 30 to the electrical energy 10 (which may be referred to as processed electrical energy). The electrical energy processing unit 32 includes an electrical transformer 34 with appropriately configured windings, e.g. for step-up or step down, depending on the configuration of the supply electrical energy 30 and desired output of the electrical energy 10.

In variant embodiments, which are not illustrated, alternative step-up or step-down converters to the transformer are implemented, e.g. a boost converter, other amplifier topology. A step-up or step-down converter may also be obviated if the electrical energy is supplied in the desired form. For example, the transformer may be obviated if the electrical energy is supplied in the desired form by: the power supply or the power supply is replaced by an input unit to receive a commercial or domestic electrical supply (a mains supply).

Where the power supply 28 provides supply electrical energy 30 as AC (e.g. the power supply 28 is arranged as a generator) or the power supply 28 is omitted and there is an input unit comprising a circuit for receiving an electrical supply (e.g. from a mains electrical supply or other electrical supply, including a generator) the electrical energy processing unit 32 includes a AC to DC converter (not illustrated) arranged to provide a DC current to the switching system 33. Where the power supply 28 provides supply electrical energy 30 as DC, e.g. a battery, an AC to DC converter is obviously obviated.

The electrical energy processing unit 32 includes a switching system 33 to generate the desired wave form (e.g. in shape and/or frequency) in the electrical energy supplied to the transformer 34. The switching system 33 is implemented an electrically operated switch (e.g. a MOSFET, relay, other transistor).

In variant embodiments of the electrical energy supply unit, which are not illustrated, the power supply (or electrical supply to the input unit) supplies electrical energy of the desired configuration. Accordingly the electrical energy processing unit is obviated. In other embodiments, the power supply (or input unit) supplies electrical energy which only needs step-up or step-down, in which case the switching system is obviated but the transformer is maintained. In other examples the switching system is present but the step-up or step-down converter is omitted.

The electrical circuitry 16 is implemented to control the electrical energy 10, through the transmission circuit 12. Said control may implement control of one or more of the following electrical quantities: electrical potential between the applicator and earth electrodes; electrical current control; frequency or duty control; phase.

In the embodiment of FIG. 5, the electrical circuitry 16 controls the switching system 33 to implement control of the voltage and current by pulse width modulation. The frequency is controlled by the rate of switching. In variant embodiments, which are not illustrated the electrical quantities can be control by other means, e.g. including by changing the taping of the transformer (on the primary and/or secondary coil), which may be implemented as a variable transformer, by implementing capacitance and/or inductance in the transmission circuit.

Figure 6:
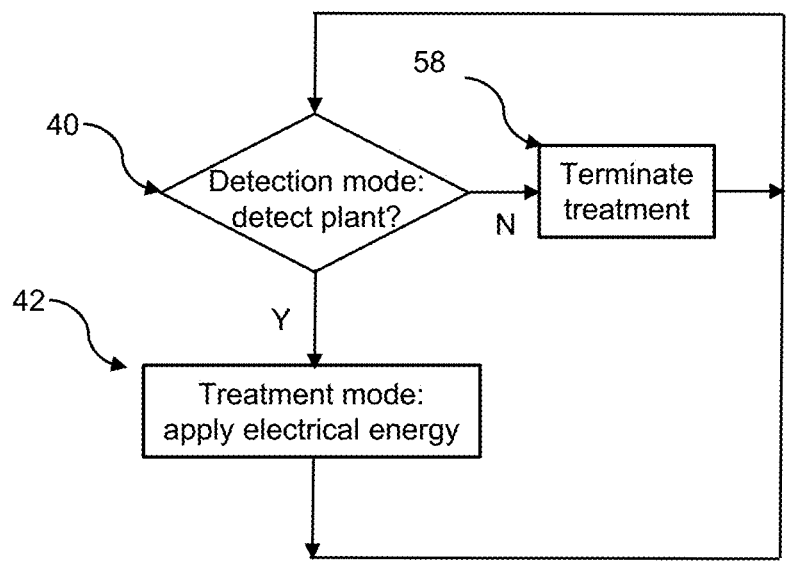
FIG. 6 is a flow diagram showing embodiment processes implemented by the apparatus of FIG. 1.

Referring to FIG. 6, in embodiments, the electrical circuitry 16 implements a plant treatment mode and a detection mode. Block 40 comprises the detection mode. At block 40 it is determined if a plant is in operative proximity to the transmission circuit 12. If a plant is determined as present, then at block 42 the electrical circuity 16 activates the plant treatment mode in which treatment electrical energy 10, for killing or at least attenuating plant growth, is applied to the plant 14 via the transmission circuit 12.

The detection mode may be immediately initiated, or user initiated, e.g. via the a user interface (such as a switch) after the apparatus has powered up and is ready to supply the treatment electrical energy 10 the plant.

Referring to FIG. 2, the detection mode is implemented by a detection system 44. Various examples of detection systems are envisaged, as described in the following.

Example 1: Detection System with Electrical Energy

In a first example, referring to FIG. 7, the detection system 44 includes circuitry to apply detection electrical energy 46 through the transmission circuit 12. This can be achieved by controlling the switching system of the converter to apply the detection electrical energy 46. Alternatively, the detection electrical energy 46 may be applied to the transmission circuit 12 via a dedicated power supply unit and converter (both not shown).

The detection system 44 implements circuitry to determine a plant in operative proximity to the transmission circuit 12 based on one or more properties of the detection electrical energy 46 (e.g. properties that may include current, voltage, power, phase) though the transmission circuit 12 crossing/having crossed a threshold. To determine said crossing of the threshold, the relevant property can be determined by a detection unit which can comprise one or more of an ammeter, voltmeter or oscilloscope etc. operatively arranged to or arranged in the transmission circuit 12 (which can be also implemented by the electrical circuitry 16, e.g. the circuitry of the detection system 44 or other related circuitry). The circuitry 16 can implement a processor (or other suitable resource) to determine (e.g. via a signal from the detection unit) the crossing of the threshold.

Figure 7A:
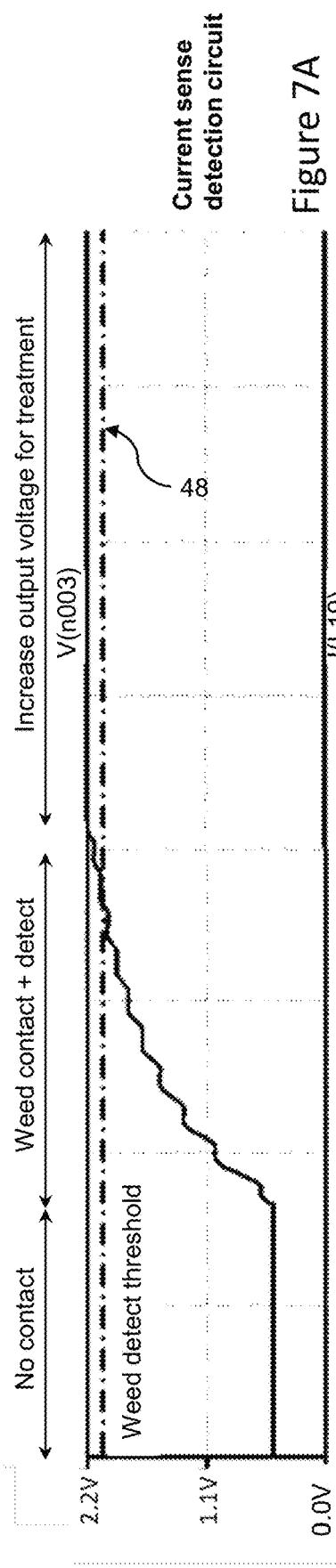
FIGS. 7A-7C are respective plots of: processed voltage; electrical current between the applicator electrode and return electrode; post processed voltage between the applicator electrode and return electrode.
Figure 7B:
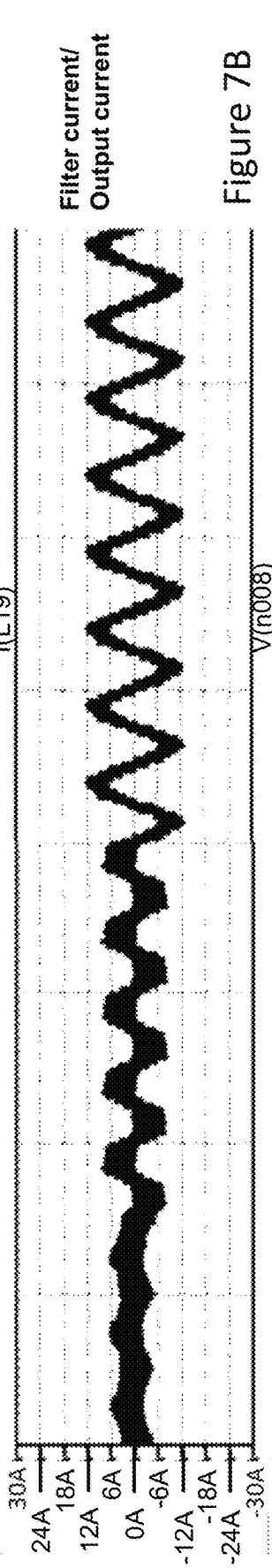
Figure 7C:
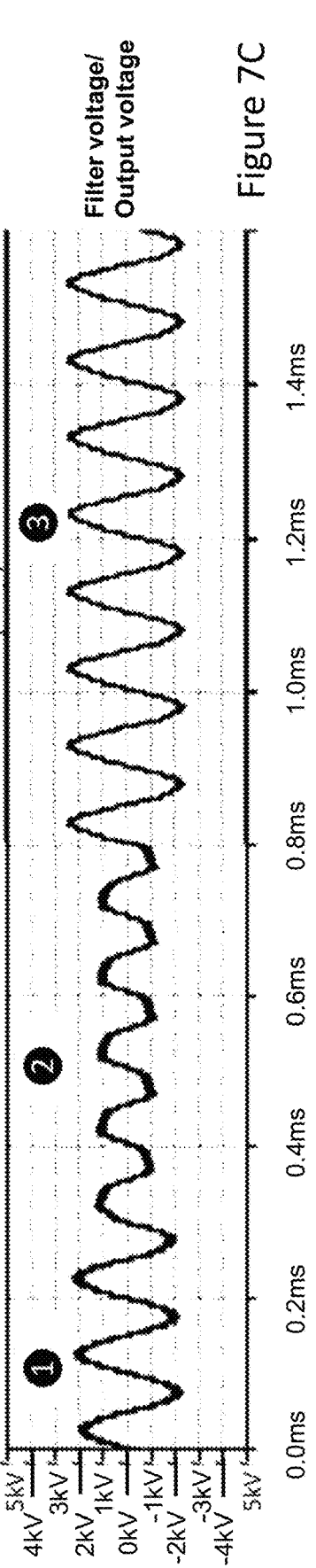

In FIGS. 7A-7C, the detection system 44 implements a voltage of the detection electrical energy 46 crossing a threshold to determine a plant in operative proximity to the transmission circuit 12.

In particular, FIGS. 7B and 7C show the respective current through and voltage over the applicator electrode 18 and return electrode 22. Phases 1-3 comprise: detection electrical energy 46 with no plant present; detection electrical energy 46 plant present, i.e. change in electrical property; treatment phase, i.e. application of treatment electrical energy 10.

FIG. 7A shows the voltage of FIG. 7C after processing. In the example the voltage has been converted to DC and reduced in magnitude. Various electrical componentry can be implemented for processing, e.g. one or more of an: isolation transformer; potential divider; AD to DC converter. The threshold 48 is crossed at a time of about 0.75 ms for the determination of a plant in operative proximity.

The detection electrical energy 46 is selected not to kill or attenuate plant growth, e.g. it may be selected to be non-destructive to the plant compared to the treatment electrical energy 10.

In examples, the detection electrical energy 46 may be selected to have a voltage (e.g. a potential over the applicator electrode 18 and earth electrode 22) in the range of 6 V-1000 V. The treatment electrical energy 10 may be selected to have a different voltage, which is in the range of 1000 V-60,000 V.

The frequency of the detection electrical energy 46 may be selected to be in the range of 1-15 kHz, e.g. if below the frequency of the treatment electrical energy 10 (which could be any greater frequency). The frequency of the detection electrical energy 46 may be selected to be in the range of 30-100 kHz, e.g. if above the frequency of the treatment electrical energy 10 (which could be any lower frequency).

The detection electrical energy 46 has a properties (e.g. properties that may include current, voltage, power, phase, frequency) which are selected so that they do not cause substantial injury to a human who may be accidentally arranged in operative proximity to the transmission circuit 12.

Example 2 Detection System with Camera System

In a second example, the detection system 44 implements a camera system 50 that is arranged to determine, in the detection mode, a plant in operative proximity to the transmission circuit 12. The operative proximity of the plant can be determined via processing one or more images from the camera system 50. Referring to FIG. 3, the camera system 50 is arranged on the body 20 of the applicator 6. In variant embodiments, which are not illustrated, other arrangements are contemplated, including on a chassis for mounting one or more components of the electrical energy supply unit 4.

In embodiments, a camera system determines plant information (e.g. a geometric property of the plant and/or a plant type) from the one or more images of the plant and a property of the treatment electrical energy 10 (e.g. properties that may include current, voltage, power, phase, frequency, duty) may be selected to most effectively kill or attenuate plant growth based on the plant information.

Example 1: Crop vs. Weed Determination

In a first example, if the plant is identified as a crop then the treatment electrical energy may not be applied, if the plant is identified as a weed then the treatment electrical energy may be applied. In an example blackgrass can comprise the weed and wheat can comprise the crop.

Example 2: Type and Geometric Determination

In a second example, the treatment electrical energy is selected based on a geometric property and/or type of the plant.

In an example: a plant can be determined to have a stem 1 mm in diameter and 5 cm tall and the treatment electrical energy is selected to be 2,000V.

In an example, a plant is determined as a Sycamore seedling (harder to treat) and the treatment electrical energy is selected to be 10,000 V, and a plant is determined as a Fat Hen (*Chenopodium album*) seedling (easier to treat) and the and the treatment electrical energy is selected to be 5,000 V.

In an example, a plant can be determined to have a stem 1 mm in diameter and 50 cm tall and the treatment electrical energy is selected to be 10,000V and a plant can be determined to have a stem 1 mm in diameter and 1 cm tall and the treatment electrical energy is selected to be 1,500V It will be understood that the electrical circuitry 16 can implemented software/hardware (e.g. with a processor, memory) and which can identify one or more of: a plant (e.g. compared to items not classified as a plant, including an animal, human, rock, building material etc); type of plant (e.g. a specific species of plant); or a geometric property of a plant, via techniques such as image processing and feature extraction. An infra-red camera system may be particularly useful in distinguishing a plant (e.g. from a human or animal) since the plant does not have a heat signature (whereas a human does).

Third Example: Detection System with Proximity Sensor

In a third example, the detection system 44 implements a proximity sensor (not illustrated) that is arranged to determine, in the detection mode, a plant in operative proximity to the transmission circuit 12. The proximity sensor can include one or more of: an inductive sensor; a capacitive sensor; an infra-red sensors; a radar; ultrasonic; a mechanically actuated sensor (e.g. a pressure sensor); other sensor.

Combined Detection Systems

In embodiments, the detection system 44 is implemented as a plurality of plant detection implementations. For example two or more of each of examples 1-3 above (including two or more of the same example or different examples). The multiple plant detection implementations can be combined with logic operators and/or a weighted average. 44 Detection system Referring to FIG. 8, a first detection system is implemented as a camera system according to the second example, and a second detection system is implemented based on a property of the electrical energy though the transmission circuit according to the first example.

At block 52 the first detection system determines if a plant is in operative proximity to the transmission circuit 12. If a positive determination is made then block 54 is executed, else the system loops back to block 52. At block 54 the second detection system determines if a plant is in operative proximity to the transmission circuit 12. If a positive determination is made then block 56 is executed, wherein treatment electrical energy 10 is applied through the transmission circuit 12.

In the above example AND logic is applied such that both the first and second detection system require a positive determination for treatment electrical energy 10 to be applied to a plant. In variant embodiments, which are not illustrated, other logic may be applied, including OR logic. In other embodiments, a weighted average is implemented.

In an example of a weighted average implementation, a detection system is implemented with first and second detection system as a camera system and a third detection system as a property of the electrical energy though the transmission circuit. The first and second detection systems have a weight of 0.5 and the third detection system has a weight of 1. An overall score of 1.5 or above is required for an overall positive determination. Each detection system has a value of 0 or 1 assigned for a negative or positive determination respectively. Hence if only the camera systems determine a positive then the score is 1 (i.e. 0.5×1+ 0.5×1), which is insufficient for an overall positive determination. However, if only one of the camera systems determine a positive and the property of the electrical energy though the transmission circuit system determines a positive then the score is 1.5 (i.e. 0.5×1+1×1), which is sufficient for a positive determination. It will be understood that in other embodiments, other weights and scores may be applied based on the selection of the type of detection system.

Figure 8:
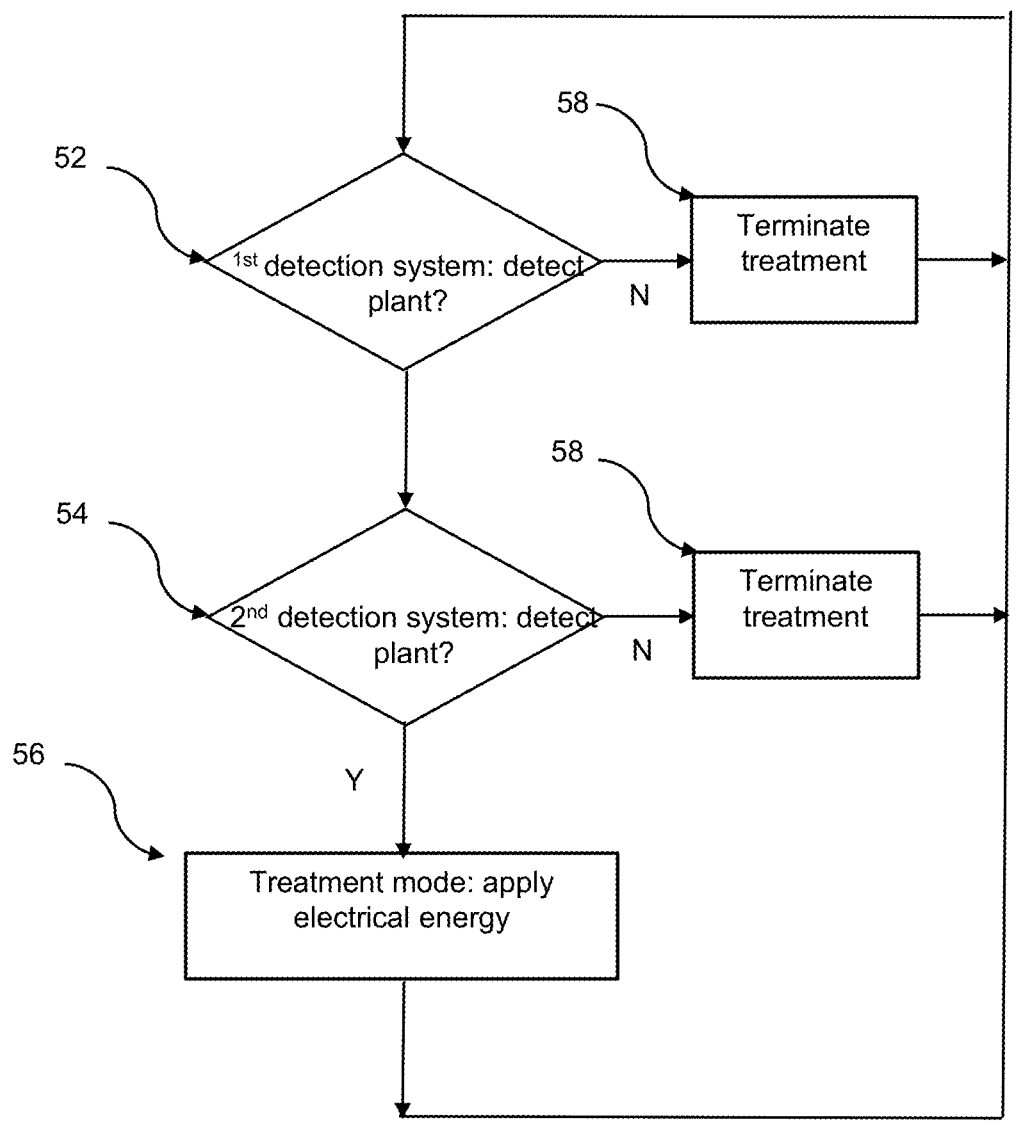
FIG. 8 is a flow diagram showing embodiment processes implemented by the apparatus of FIG. 1.

In a specific variant of the embodiment associated with FIG. 8, the camera system is implemented to determine a plant coming into operative proximity to the transmission circuit 12, which triggers plant detection based on property of the electrical energy though the transmission circuit.

As used herein "the term a plant coming into operative proximity to the transmission circuit" may refer to a prediction that the plant will at a future point in time be arranged to in operative proximity of the transmission circuit, i.e. that it will be arranged to receive electrical energy from the transmission circuit (e.g. including in direct contact or proximal to the applicator electrode, e.g. such that it can receive the electrical energy directly or via an electrical arc). To formulate this prediction, the camera system at block 52 may firstly determine that a plant is present and if determined as present also at block 52 predict if it will come into said operative proximity.

The prediction can be based on a calculated velocity vector associated with the plant, which is used to determined a future position of the plant based on the current position. The velocity vector can be determined from the image stream of the plant and/or a direction of travel from the vehicle carrying the apparatus (e.g. the electrical circuitry 16 receives navigational information, such as position and velocity information, from a vehicle navigation system).

Determination of Presence of Human

In embodiments, the detection system 44 is arranged to determine the presence of a human (not illustrated) in operative proximity to the transmission circuit 12, and based on said determination prevent the transmission of electrical energy (e.g. treatment electrical energy 10 and/or detection electrical energy 46) through the transmission circuit 12.

The detection system 44 can determine a human in operative proximity to the transmission circuit 12 using the second example implementation of the detection system. The camera system 50 may be configure to identify a human as present based on processing of the image stream. In particular, an infra-red camera may be implemented to determine a human heat signature vs. a plants.

The detection system 44 can determine a human in operative proximity to the transmission circuit 12 using the first example implementation of the detection system.

Figure 9:
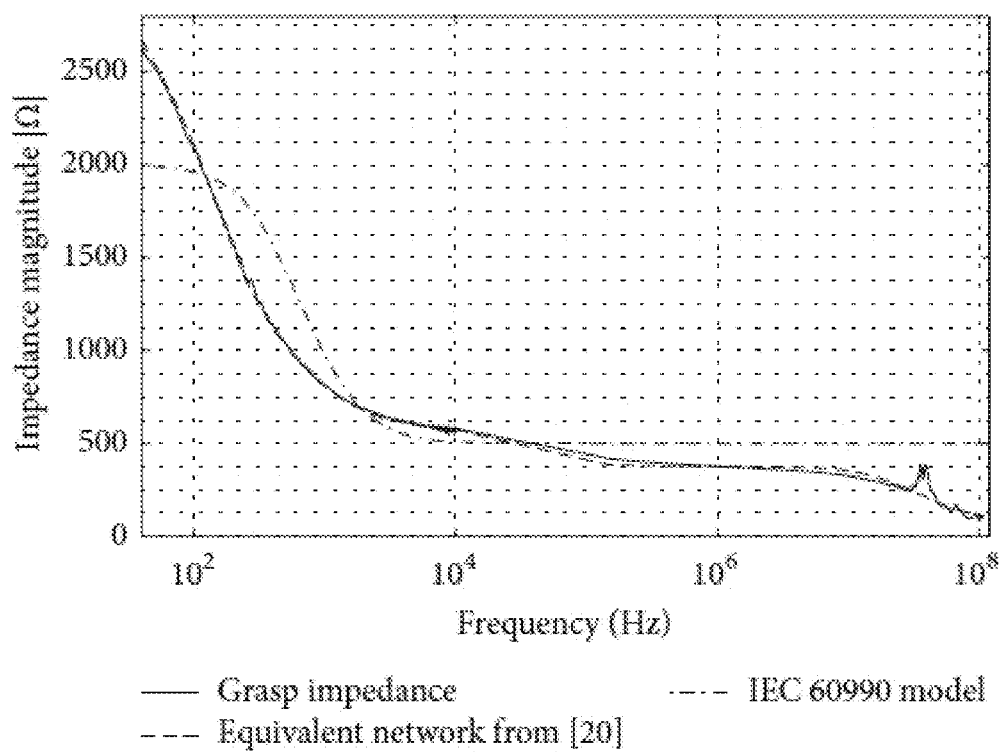
FIG. 9 is a graphical plot showing electrical impedance of a human vs. frequency of electrical energy.

In an example, with reference to FIG. 9, the relationship between the magnitude of the impedance of a human body and frequency of electrical energy applied is illustrated according to the IEC (International Electrotechnical Commission) 60990 model. The detection system 44 may determine a human in operative proximity if the impedance between the applicator electric 18 an earth electrode 22 corresponds to the value in the IEC 60990 model at the particular frequency. Accuracy may be increased sampling the impedance for more than one frequency by changing the frequency of the detection electrical energy 46, e.g. between checks (a check is discussed following).

It will be understood that the above examples can be extended in include the determination of an animal in operative proximity to the transmission circuit, e.g. by feature extraction or a similar model to the IEC 60990 model.

Implementing a Check

Referring back to FIG. 6, in embodiments, in the detection mode the electrical circuitry 16 is configured to periodically check for the presence of a plant in operative proximity to the transmission circuit 12. In particular, block 40 can be periodically executed.

In the instance of the detection system 44 implemented as the first example, a check is executed as the detection electrical energy 46 is periodically applied to the transmission circuit 12 together with the determination if a plant is in operative proximity to the transmission circuit 12.

In the instance of the detection system implemented as the second example, a check is executed by the periodic image processing of images from the camera system 50.

In the instance of the detection system implemented as the second example, a check is executed by the periodic image processing of the signal from the proximity sensor.

A check can be implemented with varying frequency, e.g. high or low frequency. For example, when the apparatus is powered up the electrical circuitry 16 starts in the detection mode with a low frequency of checks for improved safety. After a plant has been detected (and treated by the treatment electrical energy 10) the frequency may be increased from the low frequency, e.g. to a higher frequency. E.g. on start up the frequency of checks is 2 seconds and after the detection of a plant the frequency of checks is 0.1 seconds.

Referring to back to FIG. 6 and the loop connecting blocks 40 and 42, in embodiments, the plant detection and plant treatment mode are operated concurrently, for example in embodiments, the detection mode determines, during the plant treatment mode, if a plant is no longer in operative proximity to the transmission circuit 12 and based on said determination deactivates the plant treatment mode at block 58. The first-third examples of the detection system 44 can be implemented in this manner.

For example, the camera system 50 and proximity sensor of the second and third examples can continue to determine whether a plant is in operative proximity to the transmission circuit 12 during the application of the treatment electrical energy 10.

For the first example, the detection electrical energy 46 may be applied during an off cycle (e.g. between waveforms) of the treatment electrical energy 10 and, as discussed above, a plant in operative proximity to the transmission circuit may be determined based on one or more properties of the detection electrical energy 46 (e.g. properties that may include current, voltage, power, phase) though the transmission circuit crossing a threshold. The detection electrical energy 46 may be filtered from the treatment electrical energy 10 for processing of the property of the detection electrical energy 46 by a filter, e.g. they may be filtered by a high and/or low pass filter based on frequency.

Alternatively, the detection mode may determine a plant in operative proximity to the transmission circuit during the treatment mode based on one or more properties of the treatment electrical energy 10 (e.g. properties that may include current, voltage, power, phase) though the transmission circuit crossing a threshold.

In embodiments, the electrical circuity 16 is arranged to receive velocity information related to the velocity of the apparatus 2 (and/or the applicator electrode 18) and determines a frequency of checking based on the velocity information. The velocity information may be provided by the camera system 50 as described herein or from a vehicle navigation system.

Example 1: the frequency of checks is a constant at zero velocity (e.g. a check is every 2 seconds); when a velocity is determined the frequency of checks is increased (e.g. a check is every 0.5-20 milliseconds).

Example 2: the frequency of checks is a constant at zero velocity (e.g. a check is every 2 seconds); when a velocity is determined below a threshold (e.g. over 20 km/h) the frequency of checks is increased (e.g. a check is every 0.5-100 milliseconds); when a velocity is determined above the threshold the frequency of checks is further increased (e.g. a check is every 1-5 milliseconds).

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Electrical apparatus
    4 Electrical energy supply unit
        28 Power supply
        32 Electrical energy processing unit
            34 Electrical transformer
    6 Applicator unit
        18 Applicator electrode
        20 Body
    8 Earth unit
        22 Earth electrode
        24 Body
    10 Electrical energy
    30 Supply electrical energy
    12 Transmission circuit
    16 Electrical circuitry
        44 Detection system
            46 Detection electrical energy
            50 Camera system
14 Plant
26 Ground

The invention claimed is:

1. Electrical apparatus to kill a plant or at least attenuate plant growth, the apparatus comprising:
an electrical energy supply unit;
an applicator unit comprising an applicator electrode;
a return unit comprising a return electrode;
electrical circuitry;
the electrical energy supply unit arranged to apply electrical energy through a transmission circuit comprising the applicator electrode, and the return electrode,
wherein said electrical circuitry implements a plant treatment mode and wherein a detection system implements a detection mode,
wherein upon the detection mode detecting a plant as currently being in operative proximity to the transmission circuit such that it receives the electrical energy directly or via an electrical arc from the applicator electrode on activating the treatment mode, the transmission circuit activating the plant treatment mode in which treatment electrical energy, for killing or at least attenuating plant growth, is applied through the transmission circuit to the plant.

2. The electrical apparatus of claim 1, wherein in the detection mode the detection system is arranged to apply detection electrical energy through the transmission circuit and to determine a plant in operative proximity to the transmission circuit based on one or more properties of the detection electrical energy though the transmission circuit as having crossed a threshold.

3. The electrical apparatus of claim 2, wherein the detection electrical energy is selected not to kill or attenuate plant growth.

4. The electrical apparatus of claim 2, wherein the detection electrical energy is implemented with a lower or a higher electrical quantity than the treatment electrical energy, wherein the electrical quantity is one or more of the following: frequency; voltage; current; power; duty; phase.

5. The electrical apparatus of claim 1, wherein in the detection mode the electrical circuitry is configured to periodically perform a check for the determination of a plant in operative proximity to the transmission circuit.

6. The electrical apparatus of claim 5, wherein after an initial determination if a plant is in operative proximity to the transmission circuit, a frequency of the periodic check is increased.

7. The electrical apparatus of claim 5, wherein the electrical circuitry is arranged to receive velocity information and to determine a frequency of checking based on the velocity information, wherein the velocity information is provided by one or more of a camera system, a vehicle navigation system, or a navigation device incorporated by the electrical circuitry.

8. The electrical apparatus of claim 1, wherein the detection mode determines, during the plant treatment mode, a plant not in operative proximity to the transmission circuit and based on said determination deactivates the plant treatment mode.

9. The electrical apparatus of claim 1, wherein the detection system arranged to determine the presence of a human or animal in operative proximity to the transmission circuit, and based on said determination prevent the transmission of treatment electrical energy through the transmission circuit.

10. The electrical apparatus of claim 1, wherein the detection system implements a camera system that is arranged to determine, in the detection mode, a plant in operative proximity to the transmission circuit.

11. The electrical apparatus of claim 1, wherein a detection system implements the detection mode and comprises a proximity sensor that is arranged to determine a plant in operative proximity to the transmission circuit.

12. The electrical apparatus of claim 1, wherein a detection system implements a plurality of different plant detection implementations, to determine a plant in operative proximity to the transmission circuit.

13. The electrical apparatus of claim 1, wherein a camera system determines plant information from one or more images of the plant and the treatment electrical energy is selected based on the plant information.

14. A method of treating a plant with electrical energy, the method comprising:
detecting a plant as currently being in operative proximity of a transmission circuit such that it receives electrical energy directly or via an electrical arc from an applicator electrode on the transmission circuit activating the electrical energy, the transmission circuit comprising the applicator electrode, and a return electrode, and
based on the detection of the plant by the transmission circuit, applying the electrical energy to kill or at least partially attenuate growth of the plant.

* * * * *